Oct. 13, 1959  H. S. JONES ET AL  2,908,063
MOLD FOR FORMING CONCRETE FRAMES
Filed Sept. 16, 1955  6 Sheets-Sheet 1
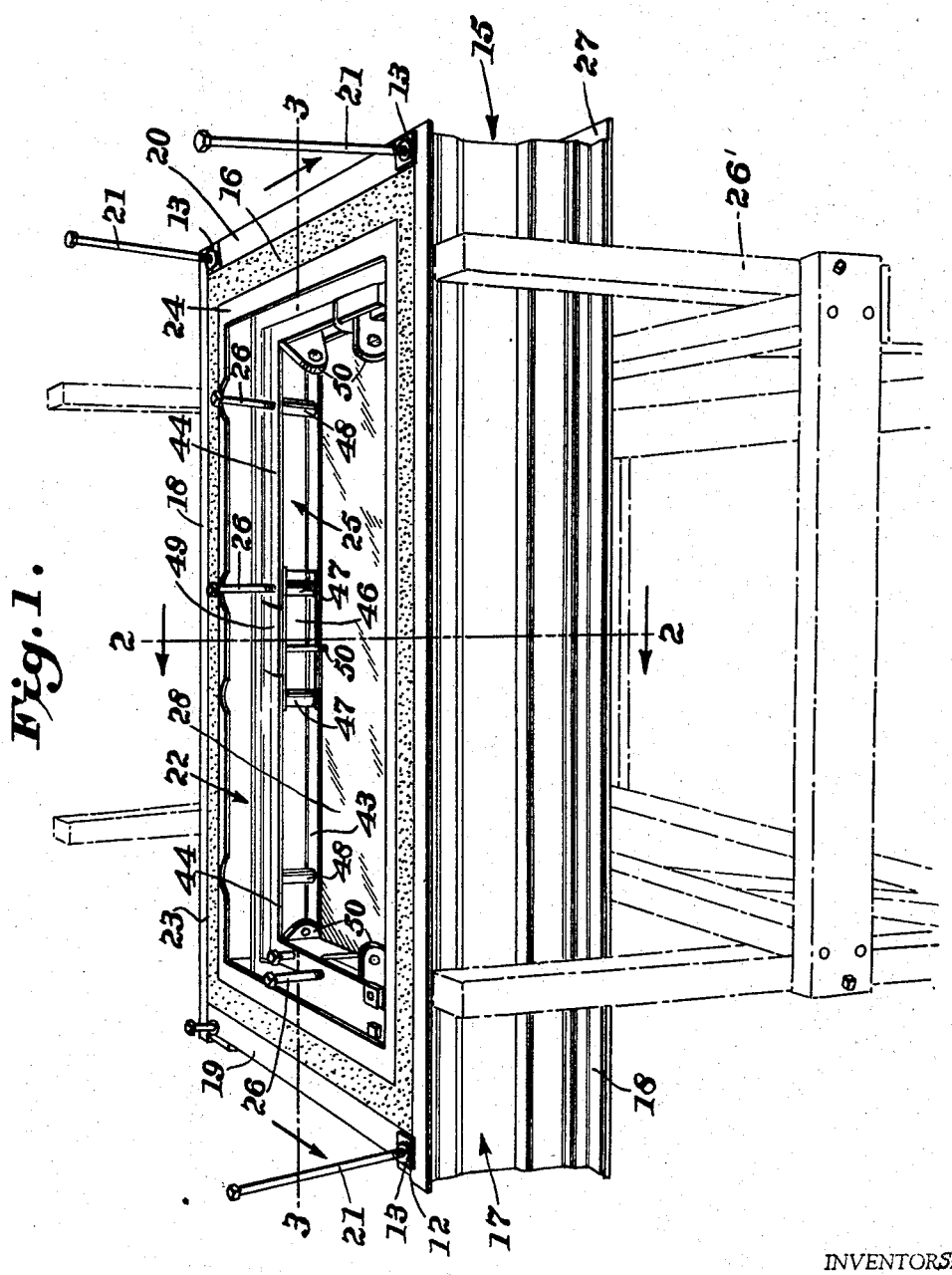
INVENTORS:
Herbert S. Jones,
George M. Frisendaux,
John Edwin Petersen,
Frank H. Shuflin,
BY
Cushman Darby Cushman
ATTORNEYS.

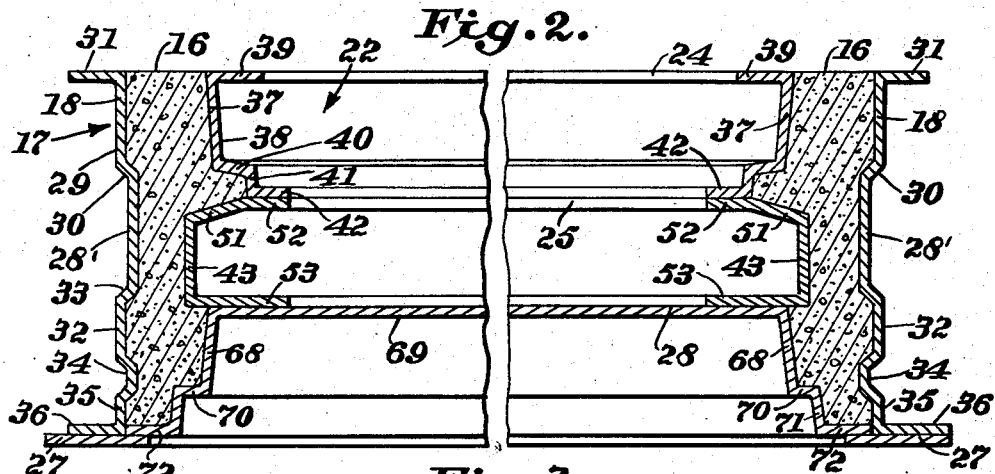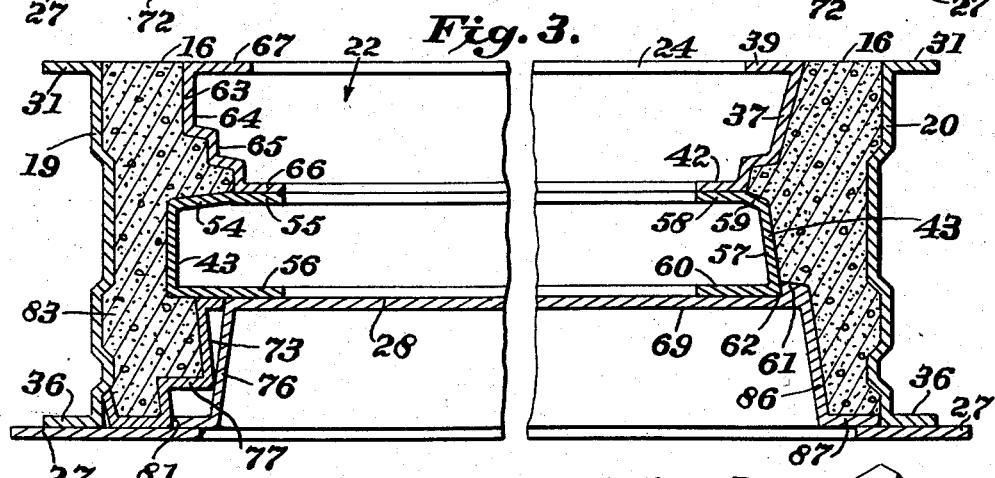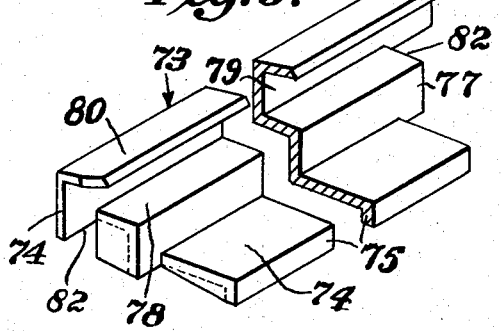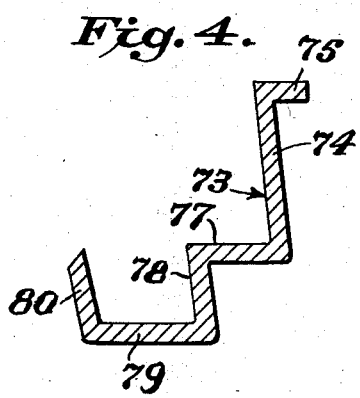

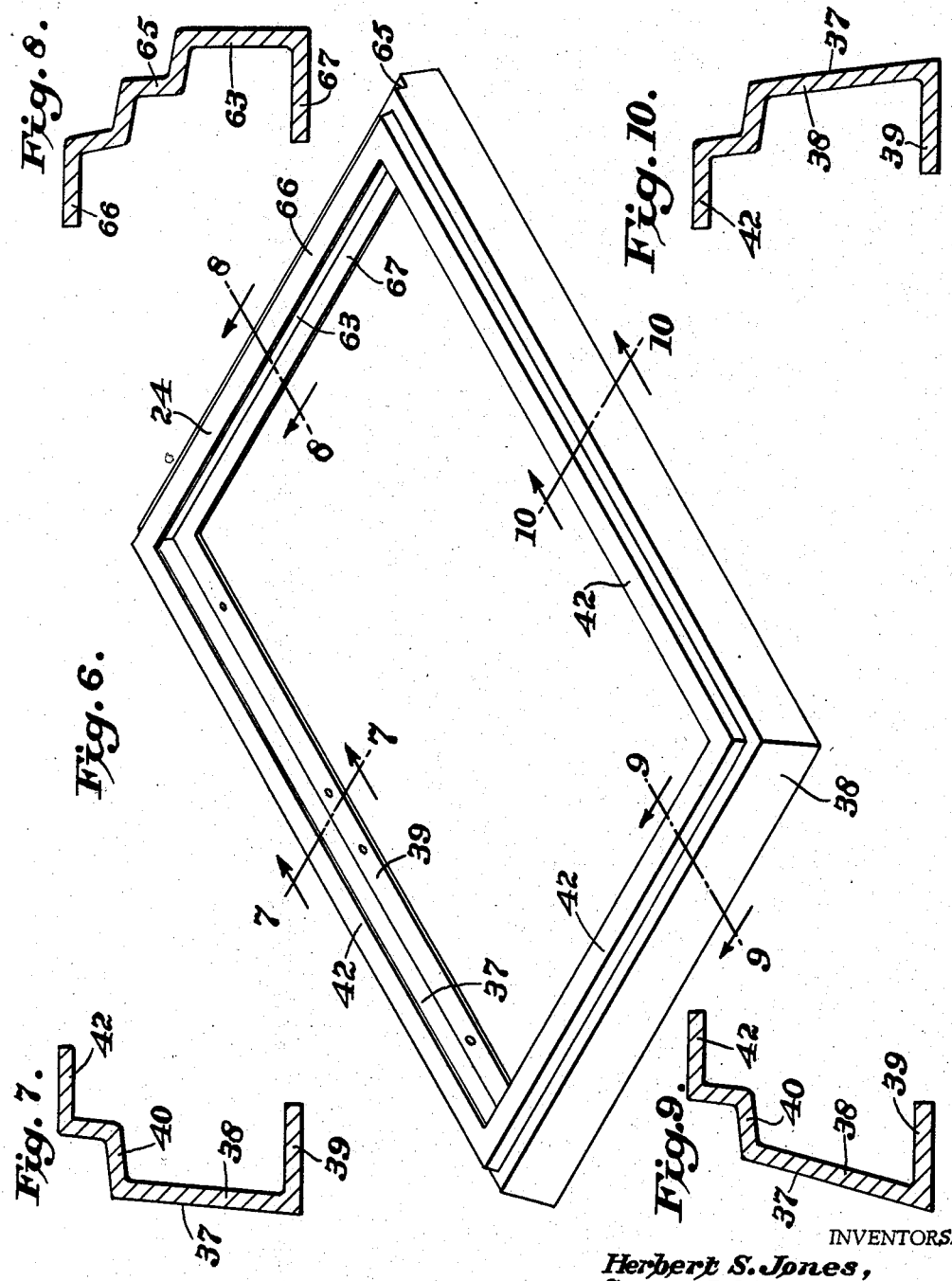

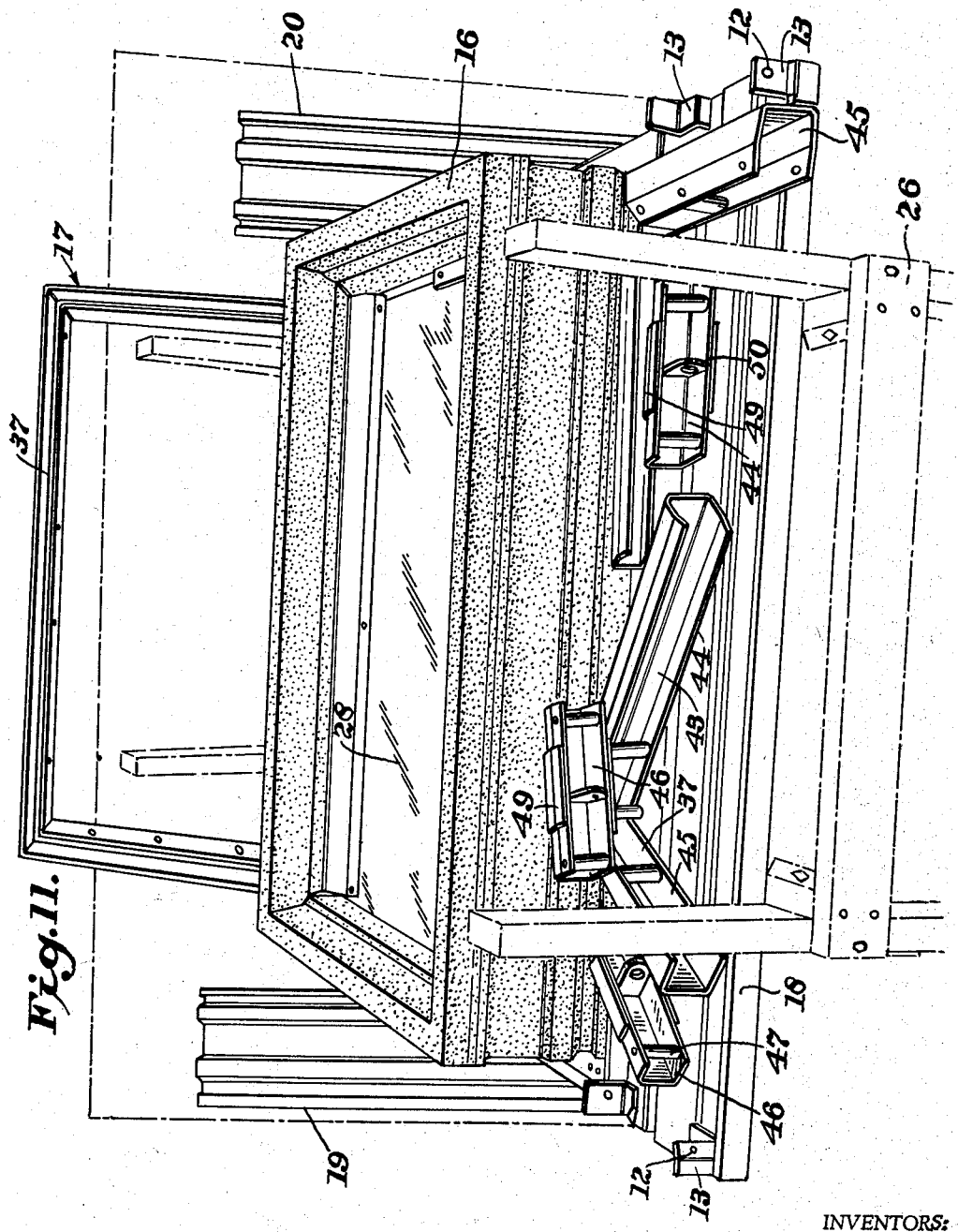

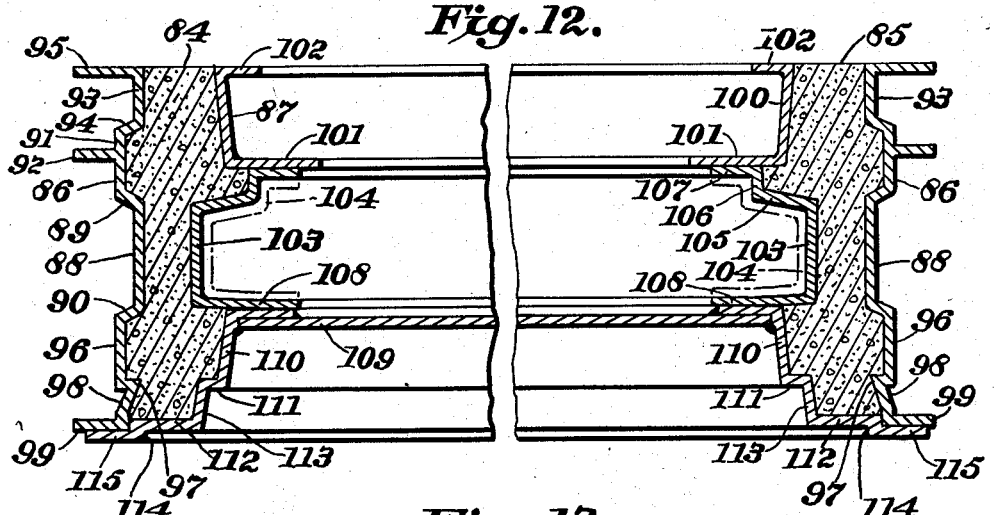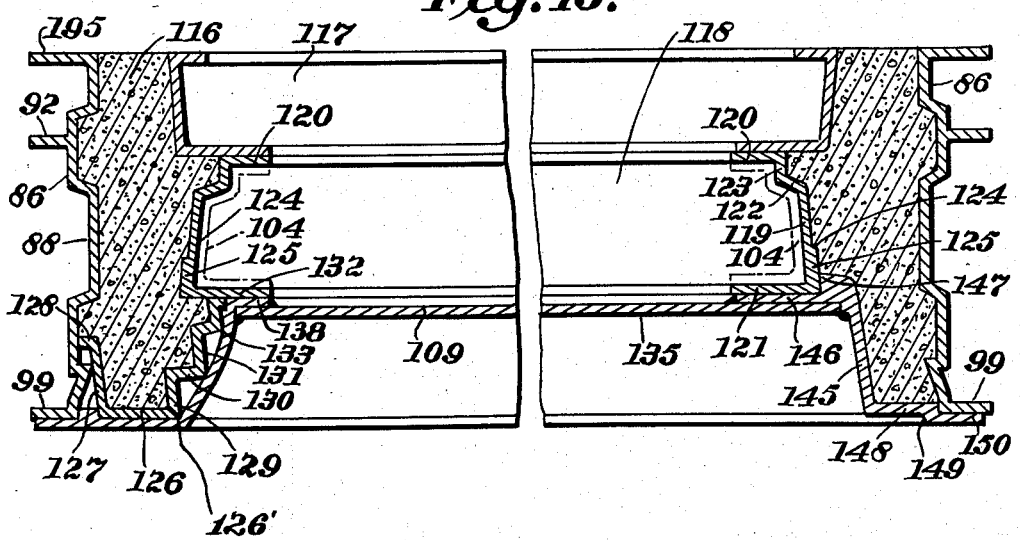

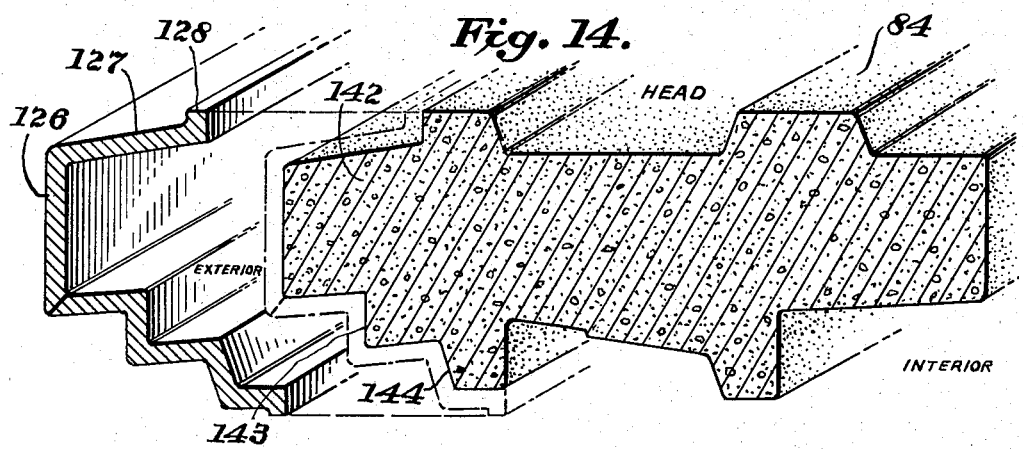
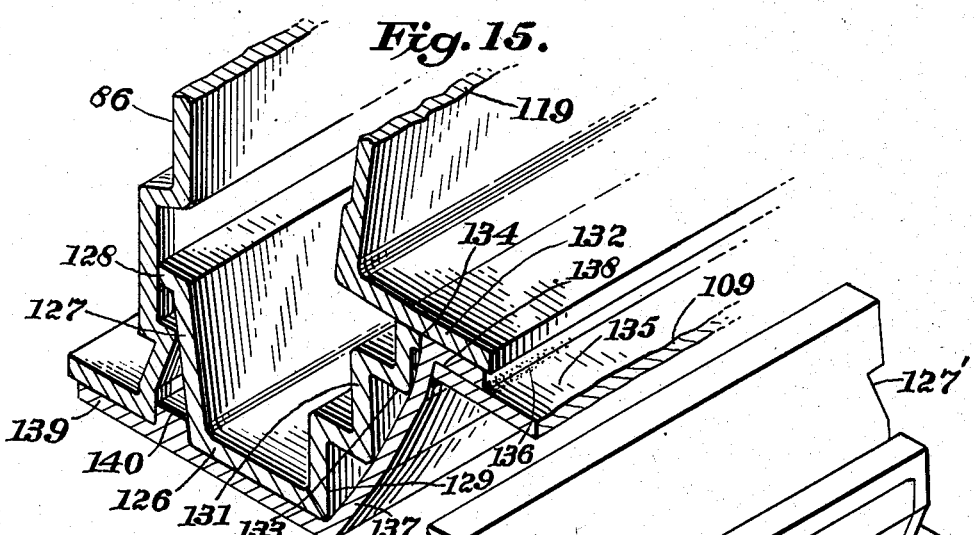
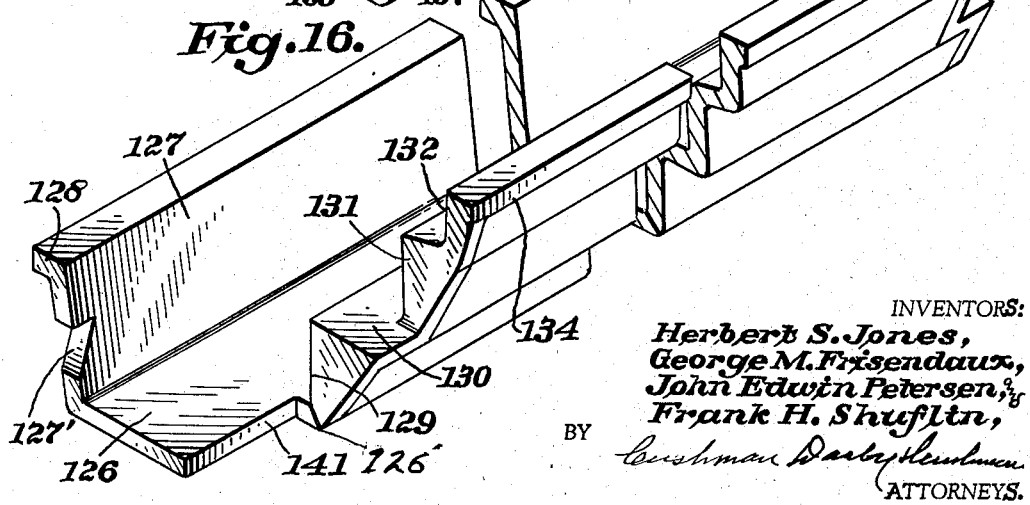

United States Patent Office 2,908,063
Patented Oct. 13, 1959

2,908,063

MOLD FOR FORMING CONCRETE FRAMES

Herbert S. Jones, George M. Frisendaux, John E. Petersen, and Frank H. Shuflin, Miami, Fla.

Application September 16, 1955, Serial No. 534,736

4 Claims. (Cl. 25—118)

The present invention relates to an improved sectional form for producing precast monolithic concrete frames, and the like, at a minimum expenditure of time, labor and cost.

An important object consists in providing a dismantlable metal form or mold for casting concrete and other material into desired sizes and shapes, in such a manner as to effect considerable saving in the cost of assembling and installing the finished concrete frame or member.

A further object consists in providing a form for producing a precast monolithically poured window frame or the like of the desired shape and configuration to be easily installed in a masonry opening, such as a window, door or the like, and in which means are provided for eliminating the use of loose fillets and filler members.

A further object comprehends the formation of a sectional form for producing concrete window frames, in which a removable form insert is arranged to be positioned within the form at the head or other locations thereof in order to provide the exterior or interior of the precast concrete form with a water stop or seal and upper outwardly and downwardly sloping sides for shedding the water without danger of the water leaking into the room or building when the parts are assembled. Additionally, the underside of the exterior surface of the concrete frame head is formed with vertically stepped depending shoulder portions shaped to provide spaced drip edges. By this novel arrangement, no separate fastening means are necessary for holding the insert form in position during the molding operation.

Other objects and advantages of the invention will become apparent from the following description when taken in conjunction with the accompanying claims and drawings.

Referring to the drawings, in which are shown several preferred embodiments the invention may assume:

Figure 1 is a perspective view showing the improved form for producing a concrete window frame of the desired size and shape;

Figure 2 is an enlarged sectional view taken substantially along the line 2—2 of Figure 1 with certain parts removed for clearness of illustration;

Figure 3 is an enlarged sectional view taken substantially along the line 3—3 of Figure 1;

Figure 4 is a detailed sectional view of the insert arranged to be positioned in the form to provide the head of the concrete frame of the desired shape;

Figure 5 is a detailed perspective view of the insert shown in Figure 4 with parts broken away for clearness of illustration;

Figure 6 is a detailed perspective view of the one-piece inner core member;

Figures 7, 8, 9, and 10 are sectional views taken substantially along the lines 7—7, 8—8, 9—9, and 10—10 of Figure 6 respectively;

Figure 11 is a view similar to Figure 1 but showing the parts dismantled and the precast monolithical concrete window frame in its final form;

Figure 12 is a sectional view similar to Figure 2 of a further modified form of the invention;

Figure 13 is a view similar to Figure 3 of the modification shown in Figure 12;

Figure 14 is an exploded sectional view of the form insert for shaping the head of the concrete frame, shown in Figure 13, to the desired shape so as to shed the water therefrom;

Figure 15 is a detailed perspective view of the assembled insert form and its associated parts shown in Figure 13; and Figure 16 is a detailed perspective view similar to Figure 5 of the modified form of insert shown in Figure 13.

Referring to the drawings 15 (Fig. 1) generally indicates a metal form for casting concrete or other suitable material into any desired size or shape, and as shown, is particularly intended to precast monolithic concrete into a window frame 16 (Fig. 11) which may be readily installed at a minimum expenditure of time, labor, and cost. More particularly, the metal form may be used to provide a concrete window frame and jalousie or other type of window or masonry opening assembly such as disclosed in Jones co-pending application, Serial No. 384,694, filed October 7, 1953.

The improved metal form or mold includes an outer shell 17 of any suitable polygonal shape (Fig. 1), and having the parallel side jamb plates or members 18 which are connected at one end by a transverse head or lintel plate 19 and at their opposite end by a transverse sill plate 20 in any suitable manner, such as by the removable threaded bolts 21 which are arranged to extend through aligned openings 12 (Fig. 11) formed in lugs 13 that extend inwardly from the sides of the shell 17 so that they may be readily assembled or disassembled. An inner metal shell or plate 22 of substantially the same configuration as the outer shell 17 is spaced therefrom at the sides and ends to provide a continuous rectangular opening 23 (Fig. 1) into which the concrete is poured in order to form the precast monolithic window frame 16.

The inner shell 22 preferably is formed of a removable one-piece rectangular core or member 24 (Fig. 6) and a lower dismantlable sectional core 25. The assembled form 15 may be mounted on any suitable support such as 26 (Fig. 1) and is provided with a horizontally disposed flat base 27 that supports a raised portion or hollow-shaped member 28 that constitutes a pallet on which rests the lower core 25 that supports the upper core 22 when the parts are assembled (Fig. 2).

In order to shape the concrete window frame 16 into the desired configuration so that the same may be installed in a masonry opening in a simple, efficient and economical manner, the spaced side jamb plates 18 of the outer shell 17 each has an intermediate inwardly extending recessed portion 28' (Fig. 2) connected to an upwardly extending vertical portion 29 by an inclined portion 30. The portion 29 terminates in a lateral and outwardly extending end flange 31. The recessed portion 28' is also connected to a depending vertical portion 32 by an inclined portion 33. The portion 32 extends into an inwardly offset portion 34, which is connected to a vertical portion 35, that is connected to the outwardly extending horizontal end flange 36, that rests on the base 27 when the parts are assembled. The jamb plates 37 of the upper inner core or member 22 are of channel shape and each is formed with an intermediate downwardly and outwardly inclined portion 38 having a lateral and inwardly extending flange 39 at its upper end which is in substantially transverse alignment with the flange 31 of the outer shell. A downwardly and outwardly inclined portion 40 is connected to the portion 37 and to a depending portion 41 that terminates in the horizontal inwardly projecting flange or end 42 that is releasably mounted on the lower sectional core 25. The core 25 is of channel shape and has separate L-shaped sections 43 (Fig. 11) provided with the angularly disposed sides or arms 44 and 45 which are detachably connected by channel shaped locking member or keys 46 arranged releasably to fit within the channels of the L-shaped members when the latter are in alignment and be detachably connected thereto by the threaded retaining bolts or pins 26 (Fig. 1) which extend through spaced sleeves 47 that are interiorly threaded to receive the bolts 26. The L-shaped members 43 are also provided with threaded sleeves 48 for receiving the spaced retaining bolts 26 for maintaining the parts in a fixed assembled position.

Each of the locking members 46 may be reinforced by channel shaped members 49 of the same size and shape as the arms 44 and 45, and which encircles an intermediate portion of the locking member. The ends of the locking member 49 are arranged to abut the adjacent ends of the spaced aligned cores of the L-shaped sections 43, so as to constitute a continuation thereof. Lugs 50 may extend outwardly from the locking members 46 and the corners of the L-shaped members 43 to facilitate the manual handling of the inner shell.

In order that the concrete window frame may be of the desired shape and accurately fit the window opening, the upper arm of the channel sections 43 at each jamb plate 18 is bent or inclined as at 51 (Fig. 2) and terminates in the horizontal arm 52. The lower arm 53 of each of the channel sections 43 extends outwardly and parallel to the arm 52 and the arm 53 rests against the pallet 28 when the parts are assembled. The top of the channel section 43 has an inclined portion 54 that terminates in a horizontal end 55 that extends substantially parallel with the lower arm 56 of the channel member. The channel sections 43 associated with the sill on the other hand, has an intermediate inclined portion 57 that is connected to the upper horizontal arm 58 by an inclined portion 59 and also to the lower horizontal arm or end 60. The pallet 28 on which the lower sectional core 25 rests has an upwardly extending shoulder or stop 61 (Fig. 3) with which the lower corner of the channel section 43 engages as at 62. The head 63 of the inner shell 22 (Fig. 3) is formed with a vertical portion 64 provided with an inwardly stepped shoulder portion 65 which terminates in a horizontal flange or end 66 that rests on the arm 55 of the adjacent channel 43. The portion 63 at the upper end is provided with a lateral and inwardly extending flange 67. The head 19 of the outer shell is substantially similar in shape to the side members 18 and has lateral end flanges 36 engaging the base 27. The sill portion 20 of the outer shell is likewise substantially similar in shape to the jamb plate or side members 18 and has its lower flanged end 36 engaging with the base 27 so that the parts of the form 15 when assembled are firmly supported on the base 27.

The pallet 28 is provided with vertical inclined sides 68 which extend downwardly from the horizontal flat portion or top 69 (Fig. 2) and each side is formed with a laterally and outwardly offset shoulder 70 having a depending inclined portion 71 which terminates in a horizontal and outwardly disposed end flange 72 that rests on the base 27 and abuts the inner lower wall of an adjacent jamb plate 18. The space between the outer and inner sill of the head (Fig. 3) has positioned therein an angularly disposed removable insert form 73 shaped to provide the head of the concrete frame with an inside and outside drop. The insert 73 is applied as a separate unit and dispenses with the use of separate fastening means for holding it in place. As particularly shown in Figures 3, 4 and 5, the insert 73 has an intermediate vertically downwardly and outwardly inclined portion 74 which terminated at its upper end in a laterally and outwardly disposed end flange 75 arranged to abut the underside of the arm 56 of the channel 43 and the adjacent inclined wall 76 of the pallet 28 (Fig. 3). A horizontal portion 77 extends outwardly from the lower end of portion 74 and is connected to a depending vertically inclined portion 78 which in turn is connected to a horizontally and outwardly disposed portion 79 that terminates in the upwardly inclined end 80. The outer end of the side 76 of the pallet 28 is bent laterally and outwardly to form an arm 81 which rests on the base 27 and abuts the adjacent corner portion of the insert 73. The horizontal portion 77 has its ends cut away as at 82 (Fig. 5) so as to be shorter in length than the end flange 75. Similarly, the horizontal portion 79 is of less length than the upper horizontal portion 77 in order to provide the head 83 (Fig. 3) of the concrete form 16 with an integral inside drop portion 84 and an outside drop portion 85 for preventing water from seeping into the room of a building when the frame 16 is installed. The pallet 28 has a depending outwardly inclined side 86 adjacent the sill of the concrete form (Fig. 3) and this side terminates in a horizontal outwardly projecting flange 87 which coacts with the wall of the outer shell 20 to form a bottom for receiving the poured concrete into the space between the inner and outer shells for the purpose of casting the concrete into the desired size and shape to form the window frame 16. Manifestly, the form 15 may be efficiently used to form other articles made of concrete and the like, accurately into various sizes and shapes.

When the parts are set up and the concrete poured into the space between the inner and outer shell, the configuration of the parts will form the walls of the concrete into the desired configuration to provide the desired window frame such as particularly shown in Figures 2 and 3. To remove the form from the cast concrete frame 16 it is merely necessary to loosen and raise the bolts 21 so as to separate the side and end members 18, 19, and 20 of the outer shell. The bolts 26 are then loosened so as to withdraw bodily the one-piece outer shell 17. The locking members 46 are then withdrawn from connection with the adjacent arms of the L-shaped members of the lower sectional core 25 so that the same may be readily dismantled and assume a position such as shown in Figure 11.

Thus, it will be seen that a dismantlable form or mold 15 is provided for forming a concrete window or the like at a minimum expenditure of time, effort and cost, and in which the parts may easily be assembled or disassembled. Further, the inner and outer walls of the form are of the desired shape and size to insure accurately forming the concrete frame of the desired shape to insure the maximum efficiency of the frame when installed. It will be noted that the form for providing the precast monolithic concrete window frame does not require the use of working fillets or filler members. Further, by reason of the separate insert form member 73, the desired shape is imparted to the head of the concrete form without requiring the use of bolts or other fastening means and for the definite purpose of obtaining inside and outside drops which insure the head of the frame having the desired wash and drip shape to prevent water from leaking into the room or building when the frame is installed, and which forms the inside and outside drops as an integral part of the monolithically cast concrete frame. When the concrete frame is formed and it is removed from the form, the insert 73 in the head may easily be withdrawn after the frame is lifted from the pallet 28 and without the necessity of requiring any tools for this removal. It will be noted that the pallet 28 is so shaped and positioned on the base 27 so as to provide means for monolithically forming the concrete frame with a reverse angle, additionally the pallet 28 coacts with the shell and the removable insert 73 for providing a drip on the exterior core of the frame head 83. Without the novel association of these parts, a reverse angle could not be provided from a rigid form. The base 27 is shown in the form of a hollow supporting member and the arms or legs 72, 76, and 87 of the pallet are welded or otherwise connected to the top thereof.

In the modification disclosed in Figures 12, 13, 14, 15 and 16, there is disclosed a form for making a precast monolithic concrete window frame 84 of slightly different configuration than the frame 16, previously described. As particularly shown in Figure 12, the metal form for providing the jambs or sides of the window frame, are provided with an outer shell or member 86 and an inner shell 87. Each of the outer shells 86 is provided with an intermediate vertical portion 88 having oppositely inclined portions 89 and 90. The inclined portion 89 extends into a vertical portion 91 which has projecting outwardly and laterally therefrom a retaining lug 92. The portion 91 is connected to a vertical portion 93 through an inclined portion 94 and the portion 93 terminates in a laterally and outwardly extending end flange 95. A downwardly extending vertical portion 96 is connected at its upper end to the inclined portion 90 and at its rear end to an inwardly offset shoulder portion 97 having a downwardly and outwardly inclined portion 98 to which is connected the end flange 99. The opposite sides of the inner shell is formed each with an upper channel shaped core 100 having its lower horizontal arm 101 of greater length than its upper arm 102. The core 100 is arranged to be releasably mounted on a lower channel shaped core 103 substantially similar in construction with the core inserts 43 previously described. The adjacent aligned arms of the core sections 103 are detachably connected by locking members or keys 104, shown in dotted lines in Figures 12 and 13, and which may be of substantially the same shape and construction as the locking members 46 previously described. Each lower core 103 has its upper arm formed with an inclined portion 105 to which is connected a vertical straight portion 106 that terminates in an inwardly extending horizontal end flange 107. The lower arm 108 of the core 103 extends substantially at right angles to the core and is of such length as to be able to firmly rest on the flat pallet plate 109 when the parts are assembled. The pallet plate 109 is welded or otherwise connected to depending outwardly inclined jamb portions 110 preferably in a manner to be described. Each side portion 110 has a laterally extending shoulder 111 to which are connected the horizontal flanges 112 by the inclined portion 113. Each of the horizontal portions 112 is connected to a depending shoulder portion 114 which terminates in the horizontal end flange 115 arranged to rest on a suitable support or base. The horizontal flange 99 of each of the jamb sides 86 of the metal forms engages the top of the flange 115 and the shoulder portion 114 of the pallet acts as a stop so as to maintain the inner and outer shells properly spaced apart so as to receive the concrete or other materials used in casting the frame.

In order to form the head or lintel 116 of the concrete frame of the desired shape and size, the outer shell 86 of the head is of substantially the same configuration as the sides which form the jambs of the concrete form (Fig. 13). The upper one-piece inner core 117 is substantially similar in size and shape as the core 100. However, the lower sectional core 118 is of channel shape and is formed with an intermediate vertical portion 119 that inclines downwardly and outwardly from its upper horizontal short arm 120 to its lower long arm 121. The portion 119 is connected to the upper arm 120 by an inclined portion 122 and a vertical portion 123. The outer surface of the portion 119 has a shoulder 124 to provide the vertical side portion 125 and thus form the adjacent wall of the concrete of the desired shape. The lower arm 121 is arranged to bear against pallet 109 and be firmly maintained in a fixed position.

In order to insure the head or lintel 116 of the concrete window frame shedding the water therefrom and also to provide efficient means for facilitating the withdrawal or dripping of the water from the head of the frame 16, a removable form or insert 126 is positioned initially in the space between the inner and outer shells for receiving the concrete as it is poured into the form and which coacts with the particular shape of the core and outer shell to mold the concrete into the desired configuration. As shown, the insert 126 is of sectional form and has one section thereof provided with an upwardly and outwardly inclined arm 127 having notches 127' in the ends thereof (Fig. 16). The arm 127 terminates in an outwardly and laterally disposed flange 128 that engages the adjacent inner wall of the shell 86. The inner arm of the insert 126 is separated from the arm 127 as at 126' and has an upwardly extending vertical portion 129 which is connected by laterally and outwardly extending portions 130 to an upwardly extending portion 131 which is connected to an upper end portion 132 by a shoulder portion 133. The end 132 may terminate in a laterally disposed shoulder or lug 134 (Fig. 15). The pallet 109 has its opposite end portions 135 welded or otherwise connected at 136 to a horizontal end flange 138 (Fig. 15) of an inclined head side 137 and also to the jamb sides 110 (Fig. 12). The side 137 terminates in a laterally and outwardly extending flange 139 (Fig. 15) which has extending upwardly therefrom a lug 140 that is positioned between the outer shell 86 and the inclined side 127 of the sectional insert 126 (Fig. 15). The opposite ends of the insert 126 are provided with reduced cut out portions 141 (Fig. 16) and the side walls are suitably shaped so that when the concrete is poured into the form, the insert will form the head or lintel thereof with an upwardly inclined water shed portion 142 (Fig. 14) and the lower face or surface of the head at the forward end thereof, with a vertical drip edge 143 and a downwardly and inwardly inclined drip edge 144 so as to produce the desired inside and outside drops for facilitating the removal of the water from the head of the frame without danger of the water seeping or working its way through to the interior of the room or building and which is readily removable so as not to require the use of fastening means such as bolts, screws or the like. Further, the particular shape of the insert 126, as shown in Figures 15 and 16, insures the formation of precast monolithic concrete window frames provided with a reverse angle that forms a drip on the exterior surface of the head frame or lintel so as to constitute a water stop or seal for preventing seepage of liquid between the concrete frame and the masonry wall when the parts are assembled. This seal also prevents the stucco or plaster from flowing so as to eliminate cracks being formed that often occur at the head or top of the window causing rain and water to leak into the building.

The inner and outer core members that constitute the inner shell are substantially similar in construction to the core members forming the head of the concrete frame and are identified by similar numerals. However, the base plate 135 of the pallet 109 adjacent the sill is preferably formed with an inclined side 145 which terminates in an inwardly disposed horizontal arm or end portion 146 (Fig. 13) provided with a shoulder portion 147 that engages the adjacent side of the vertical portion 124 of the sectional lower core 119 so as to constitute a stop therefor when the parts are set up. The plate 135 is welded to the arm 146. The inclined side 145 of the sill is connected to an outwardly extending horizontal portion 148 that is spaced from the ground or support, and is connected to a depending shoulder portion 149 that terminates in the flanged end portion 150. The outer shell 86 of the metal form adjacent the sill is similar in shape and size to the head and jambs of the outer shell, and has its end flange 99 resting on the top of the flange 150 so as to coact with the spaced side 145 of the pallet and the other parts of the inner and outer shells to form the sill of the concrete frame of the desired shape and size.

Thus, it will be seen that in all forms of the invention a simple, efficient and inexpensive dismantlable metal form or mold is provided for precasting monolithic concrete and other suitable material into any desired size and shape, so as to provide a rigid and durable concrete frame which may be readily assembled and installed as a window frame for jalousie windows and the like, at a minimum expenditure of time, labor and cost. The metal form is unique in that it does not require the use of loose fillets or filler members. Further, the sectional inner core may be readily assembled and maintained in a fixed position by the manually operable keys or locking members and can be easily dismantled upon removal of the locking members when the concrete sets or hardens. The removable insert also insures the head or lintel of the concrete form being shaped so as to preclude the entrance of water and foreign matter into the joint between the concrete frame and the window opening. The depending sides of the pallet coact with the core members and with the base to cast the inside of the concrete form and the outer surface thereof, the shape required to resist the infiltration of water, and the external sides are suitably shaped to shed the water and prevent it from collecting on parts of the frame.

It will be manifest that the forms of the invention shown are merely illustrative and that such modifications may be made as come within the scope of the following claims.

We claim:

1. A form for casting concrete into a window frame, said form including a substantially horizontal base, a pallet on the base having an intermediate raised horizontally disposed flat portion and depending sides resting on said base, an outer one-piece polygonal-shaped shell extending upwardly from the base, an inner shell of substantially the same shape as the outer shell and extending upwardly from the base and separated from the outer shell to provide a space for receiving the concrete to form the window frame, said shells having spaced side jamb plates connected by a lintel plate and a spaced sill plate for forming the side jambs, head, and sill of the concrete window frame, said inner shell having a lower sectional core and an upper core, said lower core being mounted on the pallet, and an agularly disposed insert in the space between the outer shell and the side of said pallet adjacent said lintel plate, said insert arranged to form the concrete head with an exterior portion shaped to shed water outwardly therefrom.

2. A form for casting concrete into a window frame, as called for in claim 1, in which the lower sectional core is of substantially channel shape in cross section, each of said lower core sections being L-shaped and spaced from each other, removable locking members overlapping the ends of the L-shaped members, and means for detachably connecting the locking members to the end members for maintaining the lower core in a fixed position.

3. A form for casting concrete into a window frame, as called for in claim 2, in which each of said locking member is of channel shape and is arranged releasably to fit within the adjacent sections of said lower core, and means for detachably connecting the locking members to said sections.

4. A form for casting concrete into a window frame, as called for in claim 1, in which the insert is of substantially channel shape and has a long side arm and a short side arm, said long side arm engaging said pallet and provided with offset laterally extending shoulder portions, and said short arm terminating in an outwardly and laterally extending end flange engageable with the outer shell, said insert being shaped to coact with the lintel of the concrete form so as to shed water outwardly therefrom.

References Cited in the file of this patent

UNITED STATES PATENTS

| | | |
|---|---|---|
| 1,090,211 | Hiatt | Mar. 17, 1914 |
| 1,316,462 | Penote | Sept. 16, 1919 |
| 1,331,944 | Shearer | Feb. 24, 1920 |
| 1,507,032 | Schmitz | Sept. 2, 1924 |
| 1,610,396 | Tinker | Dec. 14, 1926 |
| 1,863,549 | Lockwood | June 14, 1932 |
| 1,881,971 | Roedig | Oct. 11, 1932 |
| 2,486,038 | Landon | Oct. 25, 1949 |
| 2,539,917 | McKinley | Jan. 30, 1951 |
| 2,616,146 | Haase | Nov. 4, 1952 |
| 2,730,785 | Williams | Jan. 17, 1956 |

FOREIGN PATENTS

| | | |
|---|---|---|
| 1,001,362 | France | Feb. 22, 1952 |